(12) United States Patent
Ho et al.

(10) Patent No.: US 11,256,800 B2
(45) Date of Patent: Feb. 22, 2022

(54) ELECTRONIC APPARATUS AND UNLOCKING METHOD THEREOF

(71) Applicant: Wistron Corporation, New Taipei (TW)

(72) Inventors: Mang-Chia Ho, New Taipei (TW); Jia-Cyuan Fan, New Taipei (TW); Chi-Hsiang Yeh, New Taipei (TW)

(73) Assignee: Wistron Corporation, New Taipei (TW)

( * ) Notice: Subject to any disclaimer, the term of this patent is extended or adjusted under 35 U.S.C. 154(b) by 353 days.

(21) Appl. No.: 15/920,477

(22) Filed: Mar. 14, 2018

(65) Prior Publication Data

US 2019/0171808 A1 Jun. 6, 2019

(30) Foreign Application Priority Data

Dec. 5, 2017 (TW) .................................. 106142490

(51) Int. Cl.
*G06F 21/45* (2013.01)
*G06F 21/31* (2013.01)
*G06F 16/22* (2019.01)

(52) U.S. Cl.
CPC .............. *G06F 21/45* (2013.01); *G06F 16/22* (2019.01); *G06F 21/31* (2013.01); *G06F 2221/2105* (2013.01); *G06F 2221/2147* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,726,627 A | * | 3/1998 | Kane | .................. G08B 13/1454 340/3.31 |
| 8,925,080 B2 | | 12/2014 | Hebert | |
| 9,342,973 B2 | | 5/2016 | Tseng et al. | |
| 9,361,447 B1 | * | 6/2016 | Bowers | .................. G06F 21/36 |
| 9,372,970 B2 | * | 6/2016 | Casey | ...................... G06F 21/31 |
| 2001/0016905 A1 | * | 8/2001 | Kasamatsu | .......... G06F 13/4027 713/100 |
| 2004/0035404 A1 | * | 2/2004 | Butler, Jr. | .............. G01L 23/225 123/625 |
| 2006/0041756 A1 | * | 2/2006 | Ashok | ...................... G06F 21/31 713/183 |

(Continued)

FOREIGN PATENT DOCUMENTS

| | | |
|---|---|---|
| CN | 103179106 | 6/2013 |
| CN | 106412325 | 2/2017 |

(Continued)

OTHER PUBLICATIONS

"Office Action of Taiwan Counterpart Application," dated Jun. 5, 2016, p. 1-p. 8.

*Primary Examiner* — Richard A McCoy
(74) *Attorney, Agent, or Firm* — JCIPRNET (57) ABSTRACT

An electronic apparatus and an unlocking method thereof are provided. The electronic apparatus receives an input password. When the input password matches a valid password, the electronic apparatus is unlocked. When the input password does not match the valid password, a protection system is activated. The protection system collects usage information and posts a warning message to a social networking site based on the usage information.

20 Claims, 7 Drawing Sheets

(56) References Cited

U.S. PATENT DOCUMENTS

| | | | |
|---|---|---|---|
| 2010/0115092 A1* | 5/2010 | Westin | H04W 12/1206 709/224 |
| 2010/0130233 A1* | 5/2010 | Parker | H04W 12/1205 455/456.3 |
| 2011/0045801 A1* | 2/2011 | Parker, II | H04W 4/029 455/411 |
| 2011/0099018 A1* | 4/2011 | Neuendorf | G10L 21/038 704/500 |
| 2011/0141276 A1* | 6/2011 | Borghei | H04W 12/08 348/143 |
| 2011/0208079 A1* | 8/2011 | Babaeizadeh | A61B 5/7264 600/518 |
| 2013/0160079 A1 | 6/2013 | Hebert | |
| 2014/0162598 A1* | 6/2014 | Villa-Real | G06Q 20/4014 455/411 |
| 2014/0189583 A1* | 7/2014 | Yang | G06F 1/3234 715/800 |
| 2014/0212163 A1* | 7/2014 | Kawakatsu | G03G 15/5004 399/88 |
| 2014/0337972 A1* | 11/2014 | Foster | G06F 21/60 726/22 |
| 2015/0020558 A1* | 1/2015 | Williams | G01S 19/16 70/18 |
| 2015/0172916 A1* | 6/2015 | Parker, II | H04W 12/1206 455/411 |
| 2015/0317893 A1 | 11/2015 | Tseng et al. | |
| 2016/0134930 A1* | 5/2016 | Swafford | A47F 5/0068 725/80 |
| 2016/0300052 A1* | 10/2016 | Bailey | H04M 1/67 |
| 2017/0019400 A1* | 1/2017 | Drolshagen | H04W 12/06 |
| 2017/0214712 A1* | 7/2017 | Maxwell | G06F 21/46 |
| 2017/0351872 A1* | 12/2017 | Wu | G06F 3/0481 |
| 2018/0088861 A1* | 3/2018 | Yasin | G06F 9/30 |

FOREIGN PATENT DOCUMENTS

| | | |
|---|---|---|
| CN | 107395850 | 11/2017 |
| TW | I526998 | 3/2016 |
| TW | I590090 | 7/2017 |

* cited by examiner

ELECTRONIC APPARATUS AND UNLOCKING METHOD THEREOF

CROSS-REFERENCE TO RELATED APPLICATION

This application claims the priority benefit of Taiwan application serial no. 106142490, filed on Dec. 5, 2017. The entirety of the above-mentioned patent application is hereby incorporated by reference herein and made a part of this specification.

BACKGROUND

Technical Field

The invention relates to a protection mechanism of an electronic apparatus, particularly related to an electronic apparatus and an unlocking method thereof.

Description of Related Art

Generally, electronic apparatuses have lock mechanisms. However, in terms of password unlock, some passwords that are simple and easy to remember are prone to be cracked and misappropriated. When an electronic apparatus is misappropriated or stolen, an unauthorized user is most likely to try unlocking locked passwords to login systems and look up personal information. Once the apparatus fails to unlock within the time constraint, the unauthorized user usually turns off the apparatus, resulting in the enhancing difficulty of searching the apparatus.

Currently, when a handheld apparatus is stolen, the most common approach is to use "find my device" to search a current location of the handheld apparatus, for example, using the positing information of global position system (GPS) and sending back related information by the Internet.

Besides, the electronic apparatus has a password error locking mechanism. If there are too many unsuccessful attempts, the system locks the apparatus. Take a cellphone apparatus as an example. Common situations are as follows: locking a personal identification number (PIN) of a subscriber identity module (SIM) and locking the electronic apparatus. When a PIN code is in a lock state, it is necessary to unlock by the customer service or specialized websites provided by telecom companies. When an electronic apparatus is in the lock state, it is necessary to unlock by using software provided by cellphone system companies to recover the system. When the stolen cellphone is found, the electronic apparatus fails to function normally because of the locked PIN or locked electronic apparatus.

SUMMARY

The invention provides an electronic apparatus and an unlocking method thereof, which avoids the electronic apparatus being shut down, and extends time for searching the electronic apparatus.

The unlocking method of the electronic apparatus of the invention includes: receiving an input password by the electronic apparatus; determining whether the input password matches a valid password; and when the input password does not match the valid password, activating a protection system, collecting a usage information via the protection system; and posting a warning message based on the usage information to a social networking site.

In an embodiment of the invention, when the input password does not match the valid password, the unlocking method of the electronic apparatus further includes: determining whether the input password matches one of a plurality of invalid passwords saved in the invalid password database; saving the input password to the invalid password database and activating the protection system when determining that the input password does not match any one of the invalid passwords saved in the invalid password database; and activating the protection system when determining that the input password matches one of the invalid passwords saved in the invalid password database.

In an embodiment of the invention, the warning message includes a first warning message and a second warning message. The step of collecting the usage information via the protection system includes: capturing an image and comparing the image with a plurality of avatar information, wherein the avatar information is acquired from the social networking site. The step of posting the warning message based on the usage information to the social networking site includes: posting the first warning message marked with a user name corresponding to one of the avatar information and the image to the social networking site when the image matches one of the avatar information; and posting the second warning message without marking any user name and the image to the social networking site when the image does not match any one of the avatar information.

In an embodiment of the invention, each of the invalid passwords saved in invalid password database belongs to first type or second type. After the step of capturing the image, the unlocking method of the electronic apparatus further includes: posting the second warning message and the image to the social networking site when one of the invalid passwords matching the input password belongs to the first type; and comparing the image with the plurality of the avatar information when one of the invalid passwords matching the input password belongs to the second type.

In an embodiment of the invention, after activating the protection system, the unlocking method of the electronic apparatus further includes: activating a GPS to acquire a location information of the electronic apparatus. When the warning message is posted to the social networking site, the location information is posted together to the social networking site.

In an embodiment of the invention, the unlocking method of the electronic apparatus further includes: connecting to the social networking site and acquiring a user list authorized by an account set by the electronic apparatus, wherein the user list comprises a plurality of user accounts; and acquiring the avatar information corresponding to the user accounts from the user list.

In an embodiment of the invention, when the input password is determined not matching any one of the invalid passwords saved in the invalid password database, the step of saving the input password to the invalid password database further includes: setting a corresponding weight of the input password as 0. When the input password is determined matching one of the invalid passwords saved in the invalid password database, the weight corresponding to one of the invalid passwords matching the input password is added up.

In an embodiment of the invention, when the input password is determined not matching any one of the invalid passwords saved in the invalid password database, the step of saving the input password to the invalid password database further includes: setting the corresponding weight of the input password as a negative value. When the input password is determined matching one of the invalid passwords saved in the invalid password database, the weight corresponding to one of the invalid passwords matching the input password is added up and then whether the weight is greater than or equal to 0 is determined, and the protection system is activated when one of the invalid passwords is greater than or equal to 0.

In an embodiment of the invention, after the step of activating the protection system, the unlocking method of the electronic apparatus further includes: entering a sandbox unlock screen via the protection system, wherein the sandbox unlock screen comprises a plurality of blocked areas; and setting the input password not matching the valid password as an unlock sandbox password for clearing the blocked areas.

In an embodiment of the invention, each of the invalid passwords in the invalid password database has the corresponding weight. The number of the blocked areas increases or decreases along with the corresponding weight of one of the invalid passwords matching the input password.

In an embodiment of the invention, when the input password does not match the valid password, the unlocking method of the electronic apparatus further includes: activating a state recovery unit; monitoring whether a shutdown command or a hibernate command is received via the state recovery unit; recovering a device power state and activating a protection system after the shutdown command or the hibernate command is received.

The electronic apparatus of the invention includes: a storage device, including an unlock system and a protection system; and a processor, coupled to the storage device, driving the unlock system and the protection system, wherein when the electronic apparatus receives an input password in the lock state, the unlock system determines whether the input password matches the valid password. When the input password matches the valid password, the unlock system unlocks the electronic apparatus; when the input password does not match the valid password, the unlock system activates the protection system, and collects the usage information via the protection system and posts the warning message to the social networking site via the protection system based on the usage information.

Based on the above, the protection mechanism provided by the invention may avoid the electronic apparatus being locked or disabled for continuously typing invalid passwords, and enters a special usage mode for the unauthorized user. In addition, the protection mechanism further collects invalid passwords to filter these frequently used passwords when setting the password and to enhance the strength of the original valid password. Furthermore, the combination of social networking site further effectively expands the warning messages.

To make the aforementioned features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
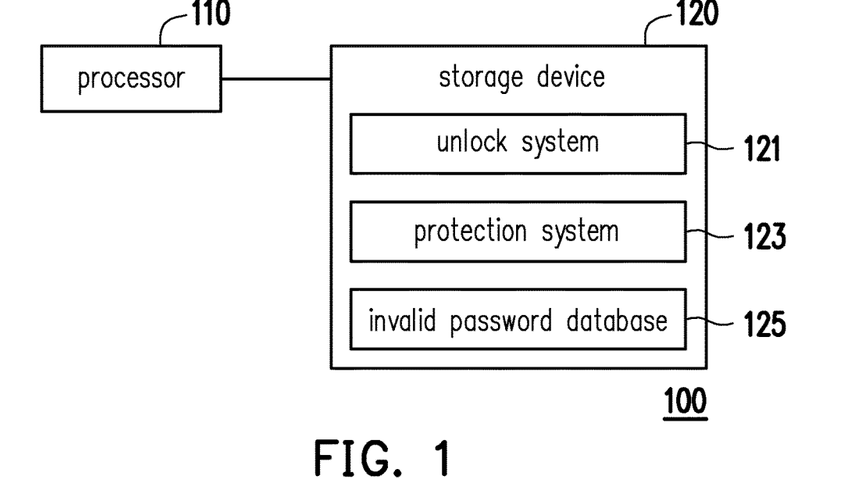
FIG. 1 is a block diagram according to an embodiment of an electronic apparatus of the invention.

FIG. 1 is a block diagram according to an embodiment of an electronic apparatus of the invention. Please refer to FIG. 1. An electronic apparatus 100 includes a processor 110 and a storage device 120. Herein, the electronic apparatus 100 could be an electronic apparatus having computing ability, such as a smartphone, a smartwatch, a desktop, a laptop, a tablet, a server, and so on.

The processor 110 is an apparatus such as a central processing unit (CPU), a graphic processing unit (GPU), a physics processing unit (PPU), a programmable microprocessor, an embedded control chip, a digital signal processor (DSP), an application specific integrated circuits (ASIC) or other similar apparatuses alike.

The storage device 120 is any form of a fixed component or a movable component. The storage device 120 is a device such as a random-access memory (RAM), a read-only memory (ROM), a flash memory, a secure digital memory card (SD), a hard drive, other similar devices or the combination of these devices. The storage device 120 includes an unlock system 121, a protection system 123, and an invalid password database 125. The processor 110 is coupled to the storage device 120, and drives the unlock system 121 and the protection system 123 to carry out the unlocking method of the electronic apparatus 100.

The invalid password database 125 saves a plurality of invalid passwords. An authorized user of the electronic apparatus 100 manages the invalid password database 125 by himself/herself that he or she chooses to add or delete certain invalid passwords. When the authorized user of the electronic apparatus 100 sets a valid password via the unlock system 121, by referring to the invalid password database 125, the unlock system 121 filters some common invalid passwords to avoid setting easily cracked passwords. The aforementioned valid password or invalid password is, for example, a digital password, a text password, a graphic password, a gesture coding, or the combination of the above. The invention is not limited thereto. Apart from setting valid passwords, the unlock system 121 also unlocks lock of normal operating environment.

Besides, the invalid password of the invalid password database 125 is divided into two types: first type not having personal information and second type having personal information. For example, the first type is a normal invalid password, which indicates that the invalid password does not have personal information, and the preset weight is set as 0. In addition, based on the number of input times, the weight is gradually increased to the invalid password database 125. For instance, when the number of input times adds one time, the weight adds 1. The second type is a special invalid password, which indicates that the invalid password has personal information, and the weight is set as null. The purpose of setting the weight of the special invalid password is to differentiate invalid password types. The invalid password types differentiate whether the unauthorized user has the personal information of the authorized user, or whether the unauthorized user is a certain figure among the authorized user's friend list on social networking sites.

Table 1 is an embodiment of the invalid password database 125, wherein Index 1 and Index 3 are normal invalid passwords, and Index 2 is a special invalid password. For example, the invalid password of Index 2 is the authorized user's telephone number.

TABLE 1

| Index | Invalid Password | Invalid Password Weight |
|-------|------------------|-------------------------|
| 1 | 1234 | 100 |
| 2 | 091234567 | Null |
| 3 | Qwerty | 50 |

When the unauthorized user inputs an invalid password "091234567" of Index 2, the unauthorized user is very likely be a friend or an acquaintance of the authorized user for the weight of Index 2 is "Null", indicating that the unauthorized user inputs a special invalid password.

Besides, when the unauthorized user inputs the invalid password "1234" of Index 1, the unauthorized user is not an acquaintance of the authorized user or is just a stranger for the weight of Index 1 is not null, indicating that the unauthorized user inputs a normal invalid password.

Accordingly, the weight setting effectively differentiates an invalid password as a normal invalid password (first type) or a special invalid password (second type), and further effectively recognizes whether the unauthorized user is acquainted with the authorized user by the normal invalid password and the special invalid password. Moreover, the weight also illustrates the usage frequency of invalid password. The bigger the weight is, the more frequently the invalid password is used. On contrary, the smaller the weight is, the less frequently the invalid password is used.

Figure 2:
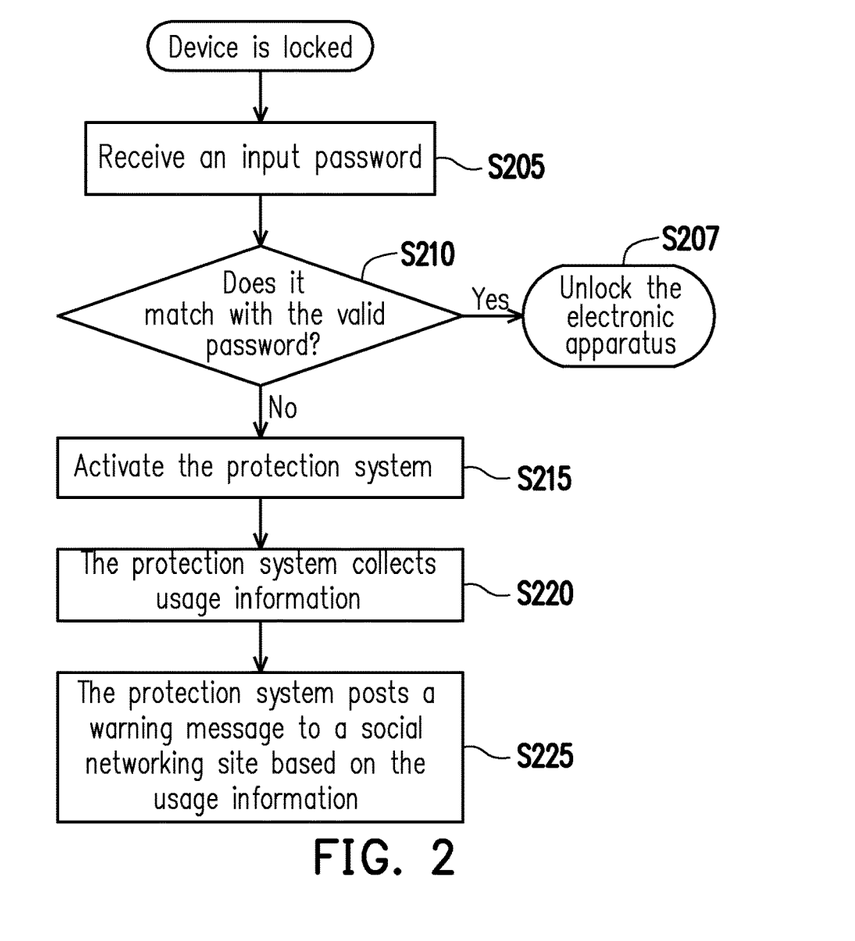
FIG. 2 is a flow chart according to an embodiment of an unlocking method of an electronic apparatus of the invention.

FIG. 2 is a flow chart according to an embodiment of an unlocking method of an electronic apparatus of the invention. Please refer to FIG. 1 and FIG. 2 at the same time. When the electronic apparatus 100 is in the lock state, in step S205, the unlock system 121 receives the input password. Then, in step S210, the unlock system 121 determines whether the input password matches the valid password. When the input password matches the valid password, in step S207, the unlock system 121 unlocks the electronic apparatus 100.

When the input password does not match the valid password, in step S215, the unlock system 121 activates the protection system 123. In step S220, the protection system 123 collects the usage information, and in step S225, posts a warning message to a social networking site based on the usage information.

Thus, by the aforementioned embodiment, when the unauthorized user inputs the invalid password, the related warning message will be posted to the social networking site.

In addition, to enhance the protection measures, the invalid password database 125 is further used to collect the input password input by the unauthorized user. Specifically, a plurality of invalid passwords is built up in the invalid password database 125 beforehand. When the input password does not match the valid password, the unlock system 121 determines whether the input password matches the invalid password saved in the invalid password database 125. When the input password is determined not matching any one of the invalid passwords saved in the invalid password database 125, the unlock system 121 saves the input password to the invalid password database 125, and then activates the protection system 123. When the input password is determined matching one of the invalid passwords saved in the invalid password database 125, the unlock system 121 directly activates protection system 123.

Accordingly, by the aforementioned embodiment, the frequently used invalid passwords are thus collected. Thus, when the authorized user sets the valid password, the passwords that are easily used are filtered and the strength of the valid password is enhanced. Furthermore, by comparing the invalid passwords saved in the invalid password database 125, the invalid input passwords are further determined being the first type not having the personal information or the second type having the personal information, and further acquired whether the unauthorized user is an acquaintance of the authorized user.

Figure 3A:
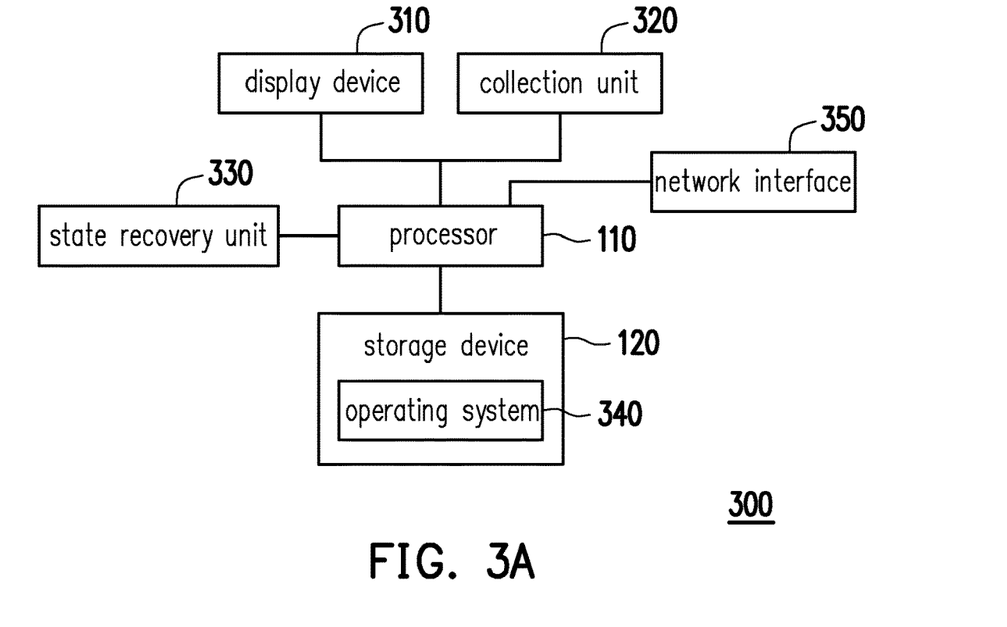
FIG. 3A and FIG. 3B are block diagrams according to an embodiment of an electronic apparatus of the invention.
Figure 3B:
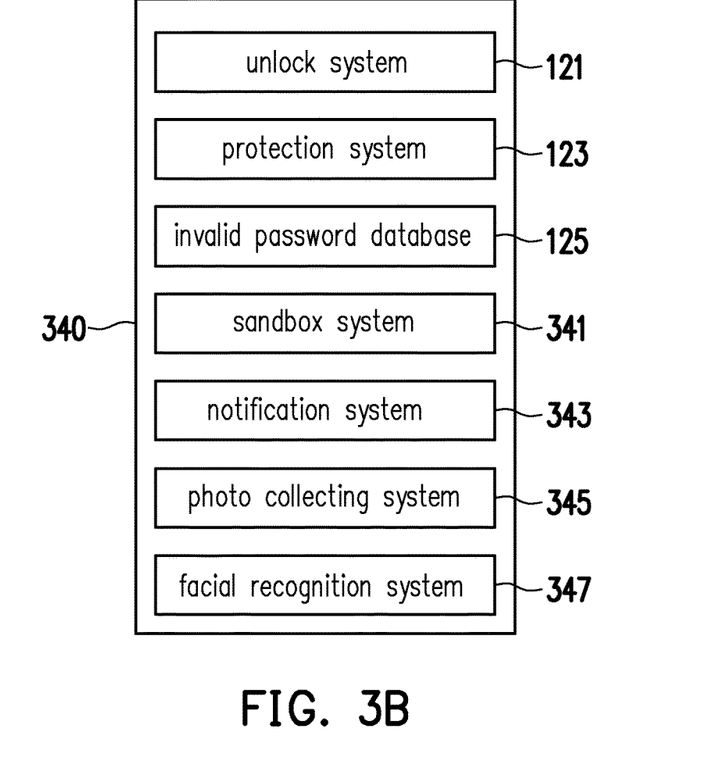

Moreover, based on the aforementioned embodiments, the embodiment below is further provided. FIG. 3A and FIG. 3B are block diagrams according to an embodiment of an electronic apparatus of the invention. In this embodiment, the same reference numerals represent the same or similar elements of FIG. 1. Please refer to FIG. 3A and FIG. 3B. The electronic apparatus 300 includes the processor 110, the storage device 120, a display device 310, a collection unit 320, and a state recovery unit 330. The processor 110 is coupled to the storage device 120, the display device 310, the collection unit 320, the state recovery unit 330, and a network interface 350.

The display device 310 here is a liquid display device (LCD), a plasma display, or a touchscreen having touch module to display an input password interface, and so on. The collection unit 320 is an audio and video recording device, an image-taking apparatus, or a GPS, or a device having the image-taking apparatus and the GPS at the same time. The image-taking apparatus captures images. The GPS acquires the current location information of the electronic apparatus 300.

The state recovery unit 330 here is a hardware device, such as an embedded controller or a real-time clock (RTC). In terms of using the RTC to realize the state recovery unit 330, the information of RTC saves in a complementary metal-oxide semiconductor (CMOS), and sets as "RTC alarm" so that the electronic apparatus 100 turns on at an appointed time. A basic input/output system (BIOS) checks the time set of the "RTC" alarm. When the time set reaches, a boot event is sent to boot the device.

Furthermore, in terms of using the embedded controller to realize the state recovery unit 330, presuming that the electronic apparatus 100 is a laptop, the power button of which is connected to the embedded chip, the appointed value is filled in the location supporting cold boot. After turning off the device, a boot signal is simulated via the embedded controller and boots the electronic apparatus 100.

The network interface 350 is, for example, a network interface card, a WiFi module, a Bluetooth module, an infrared module, a subscriber identity module (SIM), etc.

The electronic apparatus 100 posts the warning message to the social networking site via the network interface 350.

The storage device 120 includes an operating system 340. The operating system 340 includes the following software: the unlock system 121, the protection system 123, the invalid password database 125, a sandbox system 341, a notification system 343, a photo collection system 345, and a facial recognition system 347.

The sandbox system 341 is a security mechanism, providing an isolated environment to an executing program. In the sandbox system 341, internet access, real system access, and reading of the input devices are usually prohibited or strictly restricted. Therefore, the sandbox system 341 belongs to a virtualization system. Common virtualization machine products on the market are VirtualBox, VMWare, and virtualization machine products alike belong to extending applications of the sandbox system 341. In this embodiment, a fake operating system is preset in the sandbox system 341 to simulate a real operating system.

The notification system 343 and the photo collection system 345 are application programming interfaces (APIs) provided by the social networking site. The social networking site wished to connect is preset in the notification system 343. The notification system 343 sends and posts related information to the social networking site via an open API provided by the social networking site.

In the photo collection system 345, the social networking site wished to connect is preset. The photo collection system 345, via the open API provided by the social networking site, connects the set account of the electronic apparatus 300 to login the social networking site, reads a user list, which is used by the authorized account (i.e. a friend list), and then collects the avatar information of the friend list (i.e. a profile picture). After collecting of the avatar information, the photo collection system 345 categorizes the avatar information based on types of the social networking site and the user account and directly saves to a local device, that is, an image database in the storage device 120 of the electronic apparatus 300.

The facial recognition system 347 recognizes faces in the image captured by the image-taking apparatus and performs the face recognition.

Figure 4:
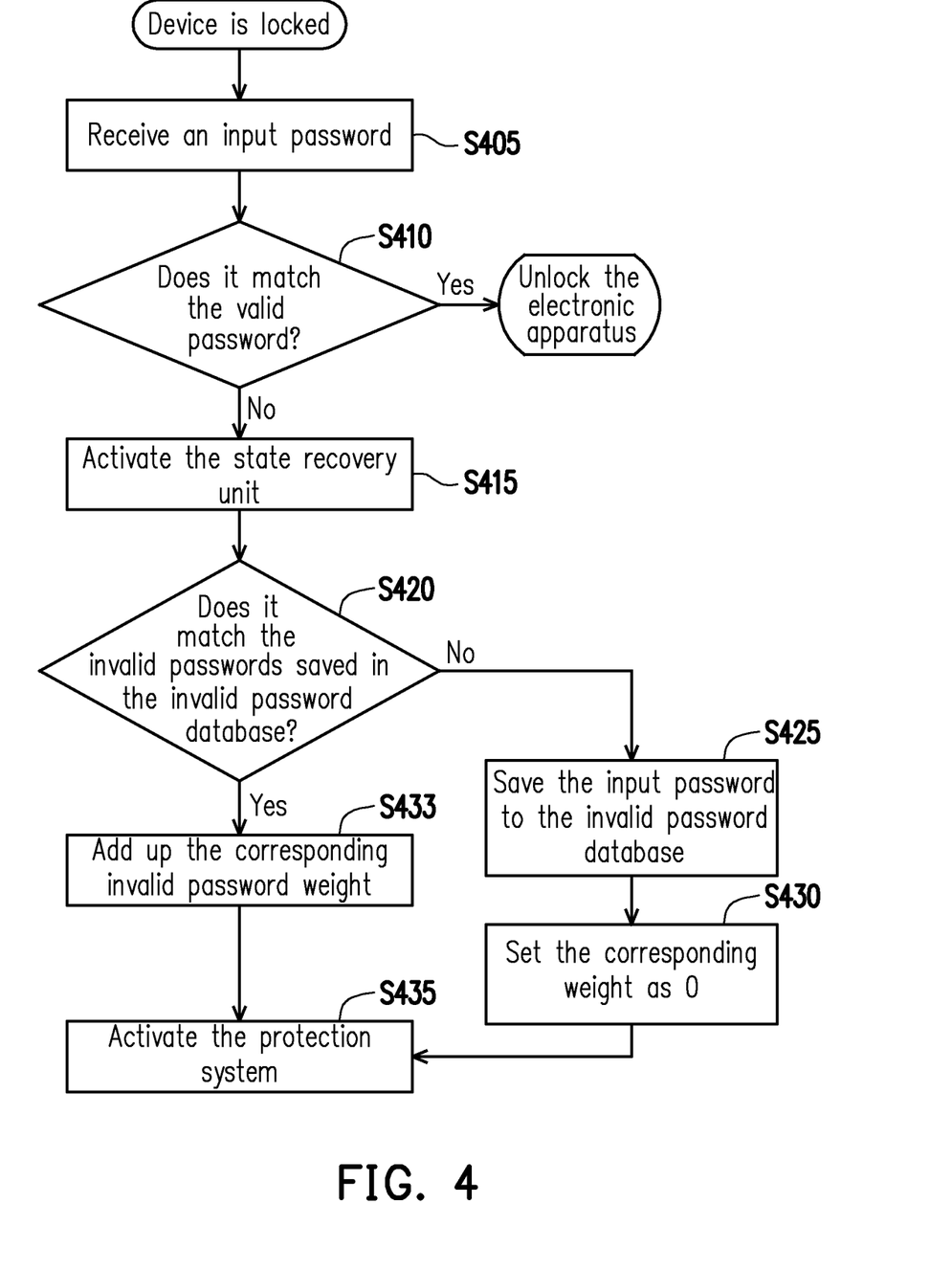
FIG. 4 is a flow chart according to another embodiment of an unlocking method of an electronic apparatus of the invention.

FIG. 4 is a flow chart according to another embodiment of an unlocking method of an electronic apparatus of the invention. Please refer to FIG. 3A, FIG. 3B, and FIG. 4 at the same time. In step S405, the unlock system 121 receives the input password. Then, in step S410, the unlock system 121 determines whether the input password matches the valid password. When the input password matches the valid password, the unlock system 121 unlocks the electronic apparatus 300.

When the input password does not match the valid password, in step S415, the unlock system 121 activates the state recovery unit 330. Here, the state recovery unit 330 monitors whether the electronic apparatus 300 receives a shutdown command or a hibernate command. When the state recovery unit 330 monitors that the electronic apparatus 300 receives the shutdown command or the hibernate command, the state recovery unit 330 recovers the device power state and wakes up the protection system 123.

Besides, when the input password does not match the valid password, in step S420, the unlock system 121 determines whether the input password matches the invalid passwords saved in the invalid password database 125. When the input password is determined not matching any one of the invalid passwords saved in the invalid password database 125, in step S425, the unlock system 121 saves the input password to the invalid password database 125. Also, in step S430, the unlock system 121 sets the corresponding weight of the input password saved in the invalid password database 125 as 0. Then, in step S435, activates the protection system 123.

On the other hand, when determining that the input password matches one of the invalid passwords saved in the invalid password database 125, in step S433, the weight corresponding to one of the invalid passwords matching the input password is added up. That is, add 1 to the weight of the invalid password saved in the invalid password database 125 to illustrate the increase of usage frequency, and then, execute step S435. The unlock system 121 activates the protection system 123.

By using the method of FIG. 4, when the input password is not the valid password, the protection system 123 is activated and the input password not saved in the invalid password database 125 may be added to the invalid password database 125.

For example, when an unauthorized user, Wang Xiao-Ming, uses the electronic apparatus 300 and tries to unlock, he inputs a set of input password "Wistron". Upon examining, the unlock system 121 finds out that the input password is not the valid password. The unlock system 121 searches and compares the current received input password from the invalid password database 125. When finding out that the input password has already been saved in the invalid password database 125, 1 is added to the weight of the invalid password, "Wistron", in the invalid password database 125, and then the unlock system 121 calls the protection system 123 and directly enters the protection mechanism with the set of the input password (invalid password).

Another example, when the unauthorized user, Wang Xiao-Ming, uses the electronic apparatus 300 and tries to unlock, he inputs the set of input password "Wistron". Upon examining, the unlock system 121 finds out that the input password is not the valid password. The unlock system 121 searches and compares the current received input password from the invalid password database 125. When finding out that the input password is not saved in the invalid password database 125, the unlock system 121 calls the invalid password database 125, adds this input password to the invalid password database 125, sets the weight of the invalid password as 0, and in the end, calls the protection system 123 and directly enters the protection mechanism with the set of the input password (invalid password).

Figure 5:
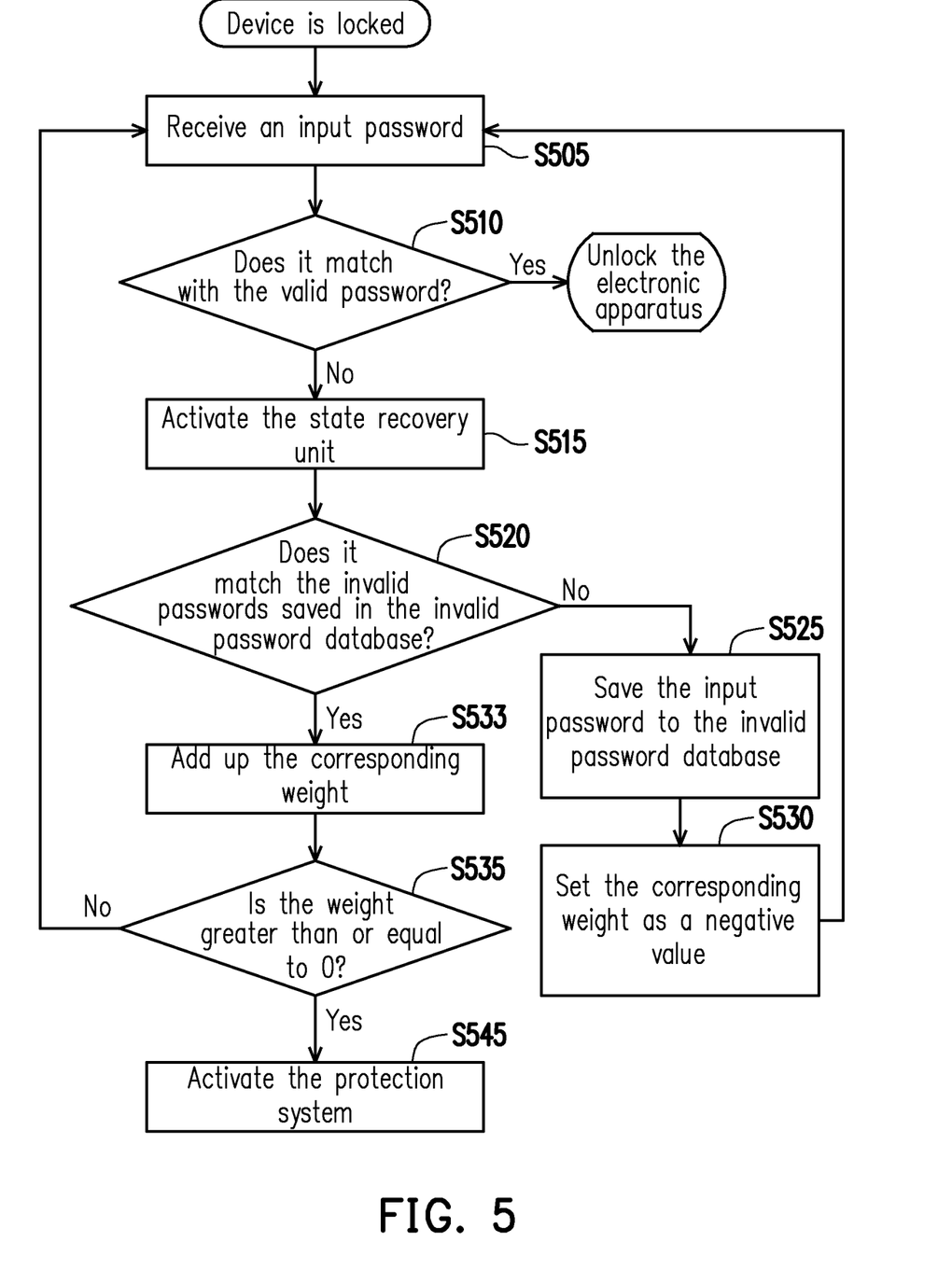
FIG. 5 is a flow chart according to still another embodiment of an unlocking method of an electronic apparatus of the invention.

An embodiment is further disclosed below for illustration. FIG. 5 is a flow chart according to still another embodiment of an unlocking method of an electronic apparatus of the invention. Please refer to FIG. 3A, FIG. 3B, and FIG. 5 at the same time. The steps of S505 to S520 of this embodiment are the same as the steps of S405 to S420 of FIG. 4.

In step S505, the unlock system 121 receives the input password. Then, in step S510, the unlock system 121 determines whether the input password matches the valid password. When the input password matches the valid password, the unlock system 121 unlocks the electronic apparatus 300. When the input password does not match the valid password, in step S515, the unlock system 121 activates the state recovery unit 330. In addition, when the input password does not match the valid password, in step S520, the unlock system 121 determines whether the input password matches the invalid passwords saved in the invalid password database 125.

When the input password is determined not matching any one of the invalid passwords saved in the invalid password database 125, in step S525, the unlock system 121 saves the input password to the invalid password database 125, and in step S530, the unlock system 121 sets the corresponding weight of the input password as a negative value. For example, the corresponding weight of the saved input password is set as −3. Then, return back to step S505, and restart to receive another input password.

When determining that the input password matches one of the invalid passwords saved in the invalid password database 125, in step S533, the corresponding weight is added up. Then, in step S535, whether the weight corresponding to one matched invalid password is greater than or equal to 0 is determined. When the weight corresponding to one matched invalid password is greater than or equal to 0, in step S545, the protection system 123 is activated. When the weight corresponding to one matched invalid password is smaller than 0, in step S545, return back to step S505 and restart to receive another input password.

By using the method of FIG. 5, the invalid password that has just been stored in (does not previously existed in) the invalid password database 125 presets a negative value of weight. When the number of times for inputting the invalid password arrives a certain number of times, the protection system 123 is activated. By doing so, whether the password is a frequently used invalid password or a simple input mistake is filtered.

For example, when the unauthorized user, Wang Xiao-Ming, uses the electronic apparatus 300 and tries to unlock, he inputs the set of input password "Wistron". Upon examining, the unlock system 121 finds out that the input password is an invalid password. The unlock system 121 searches and compares the current received input password from the invalid password database 125. When finding out that the input password is not saved in the invalid password database 125, the unlock system 121 calls the invalid password database 125, adds this input password to the invalid password database 125, and sets the weight of the invalid password as a negative value (e.g. −3). At this time, the unlock system 121 does not directly call the protection system 123 and does not let the unauthorized user, Wang Xiao-Ming, enter the protection mechanism. However, after the invalid password is input for three times and the weight of the invalid password is added up to 0, the unlock system 121 then calls the protection system 123 to let the unauthorized user, Wang Xiao-Ming, enter the protection mechanism with the set of the input password.

The protection system 123 provides a protection mechanism, for allowing the unauthorized user to enter the sandbox system 341 instead of the original operating system, which prevents the unauthorized user from accessing the original contents in the device.

To increase the authenticity of the fake operating system and increase the chances of collecting more comprehensive information, before entering the fake operating system provided by the sandbox system 341, same as a normal operating system, it is required to unlock the locked screen to normally enter the fake operating system provided by the sandbox system 341. However, the unlock password is set as the current invalid input password.

Figure 6:
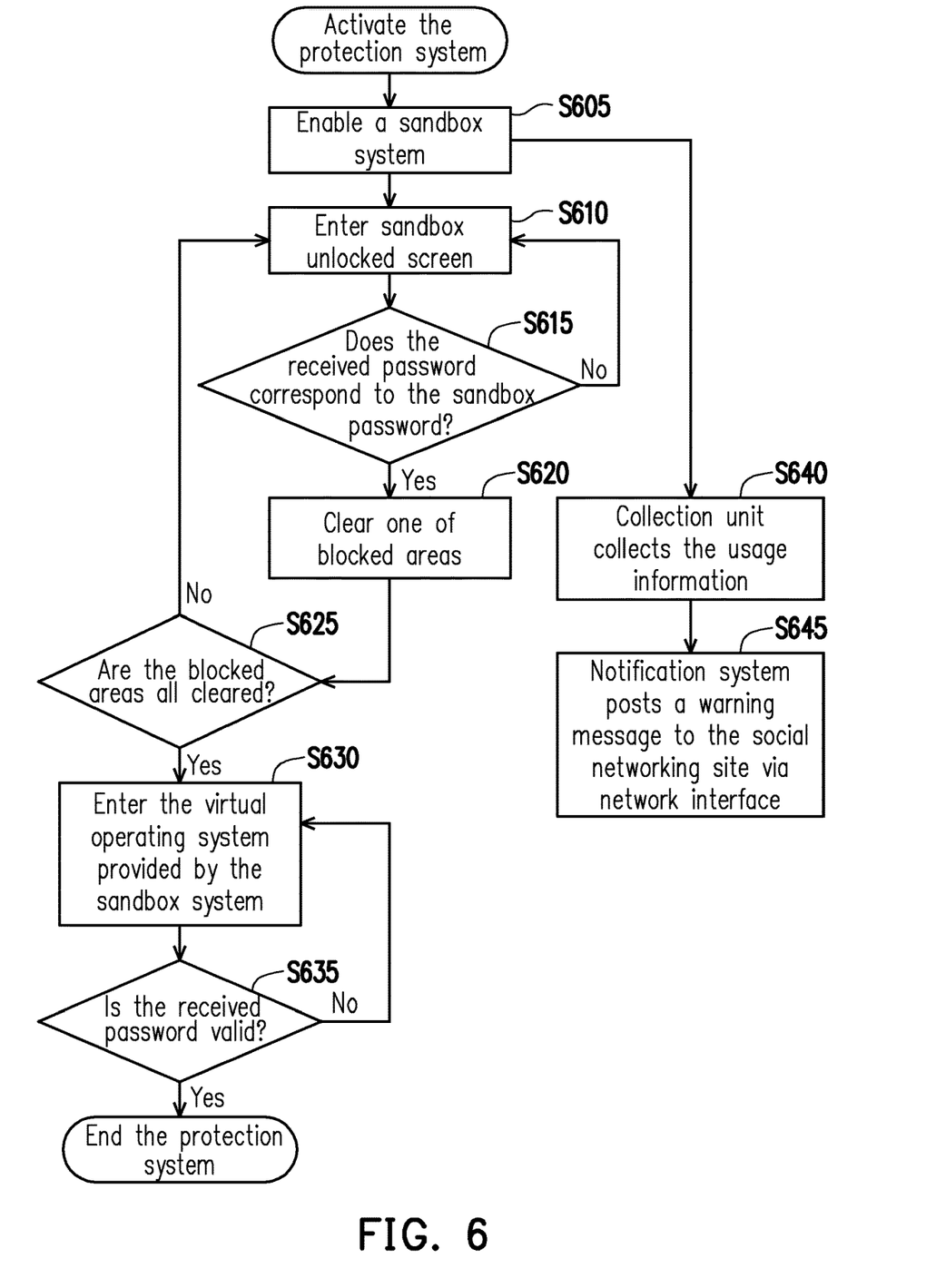
FIG. 6 is a flow chart according to an embodiment of an unlocking method of a sandbox system of the invention.

FIG. 6 is a flow chart according to an embodiment of an unlocking method of a sandbox system of the invention. Please refer to FIG. 3A, FIG. 3B, and FIG. 6 at the same time. In the state that the protection system 123 activates, in step S605, the protection system 123 enables the sandbox system 341. Then, in step S610, the sandbox unlock screen is entered to receive one received password. Here, the sandbox unlock screen includes a plurality of blocked areas. In addition, the sandbox system 341 sets the invalid input password as the unlock sandbox password to clear each blocked area.

The number of the blocked areas increases or decreases along with the corresponding weight of the input invalid in the invalid password database 125. For example, the bigger the weight is, the more frequently the invalid password is used. Therefore, the invalid password is usually a set of strings that are short or easy to remember. The bigger the weight is, the more blocked areas are required. The time of unlocking the sandbox unlock screen is thus extended. On the other hand, the smaller the weight is, the less frequently the invalid password is used. Therefore, the invalid password is usually a set of strings that are long or hard to remember. The smaller the weight is, the less blocked areas are required, so that there is enough time to collect the usage information.

Then, in step S615, determine whether the received password matches the unlock sandbox password. If the received password matches the unlock sandbox password, in step S620, one of the blocked areas is cleared. After that, in step S625, whether the blocked areas are all cleared is determined. If the blocked areas have not all cleared yet, return back to step S610, the user continues to input the received password until all the blocked areas are cleared. After clearing all the blocked areas, in step S630, the fake operating system provided by the sandbox system 341 is entered.

The lock method of the sandbox system 341 is to segment the sandbox unlock screen into a plurality of blocked areas. Each time a valid unlock sandbox password is input, one blocked area is cleared. The unlock sandbox password of each of the blocked area is the same. When all the blocked areas are cleared, the sandbox system 341 is entered and the virtual content of the sandbox system 341 is used. Table 2 is an embodiment illustrating the relationship between the weight and the number of blocked areas.

Take the invalid password "1234" as an example. The weight of the set of the invalid password is big. The invalid password is also a frequently used and short password. Therefore, it is required to add the number of unlock times for the user to spend more time inputting password to extend time collecting the usage information. The chances of collecting more comprehensive information are thus increased.

Take "TodayIsAGoodDay" as an example. The weight of the invalid password is low. The invalid password is also a less frequently used and longer password. Since inputting the password takes longer period of time, there is no need to add additional number of times to extend time collecting the usage information.

Take "66123415" as an example. Since the weight of the password is null, belonging to the special invalid password, the number of the blocked areas is decided based on the authorized user's personal preferences.

TABLE 2

| Invalid Password | Invalid Password Weight | Number of Bock Area |
|---|---|---|
| 1234 | 100 | 10 |
| TodayIsAGoodDay | 2 | 2 |
| 66123415 | null | 5 |

Figure 7A:
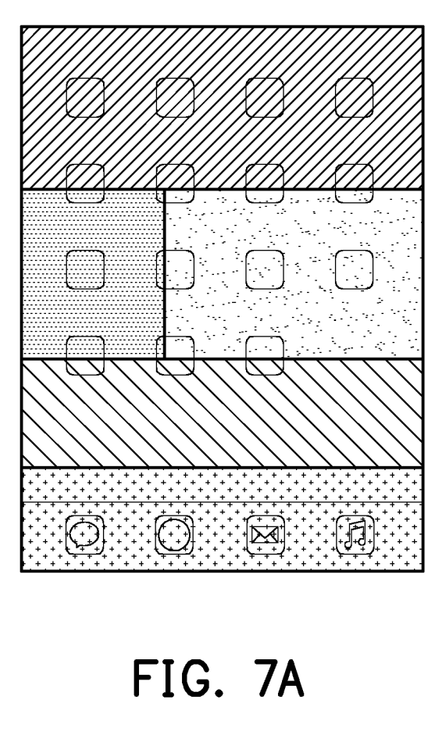
FIG. 7A to FIG. 7C are schematic views according to an embodiment of a sandbox unlock screen of the invention.
Figure 7B:
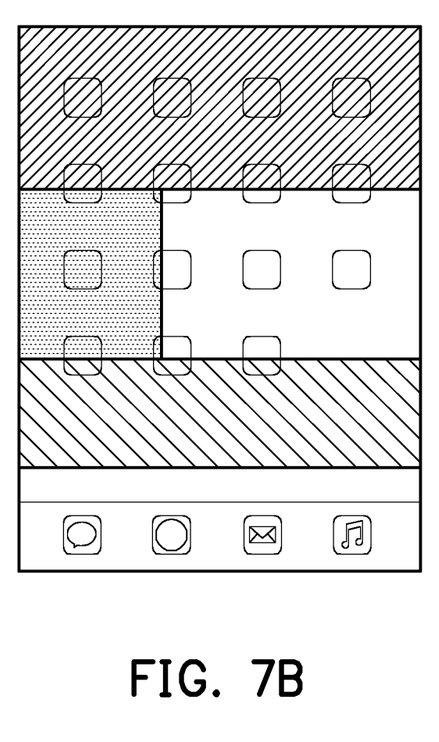
Figure 7C:
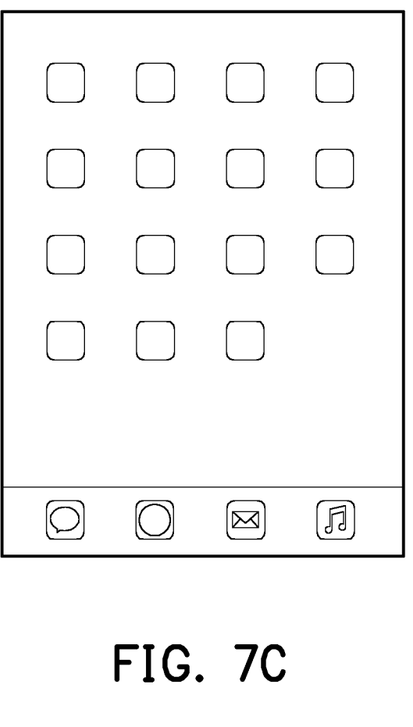

FIG. 7A to FIG. 7C are schematic views according to an embodiment of a sandbox unlock screen of the invention. Please refer to FIG. 7A to FIG. 7C. The protection system 123 locks the display screen of the fake operating system provided by the sandbox system 341 with five block areas, as illustrated in FIG. 7A. When the valid unlock sandbox password is input by the unauthorized user, a blocked area is cleared, and the current user is notified that all of the blocked areas are cleared.by inputting four times of the same unlock sandbox password. As illustrated in FIG. 7B, two block areas are cleared, and by further inputting the same unlock sandbox password for three times, all of the blocked areas are cleared. By repeating the steps until all blocked areas are cleared, the fake operating system provided by the sandbox system 341 is thus entered, as illustrated in FIG. 7C.

During the period when the unauthorized user starts to unlock the lock state of the fake operating system provided by the sandbox system 341 and unlock, in step S640, the protection system 123 collects the usage information via the collection unit 320. For example, collect facial features of the current user and the location information by using the image-taking apparatus and the GPS of the collection unit 320. Afterwards, in step S645, the notification system 343 posts the warning message to the social networking site based on the usage information via the network interface 350.

Besides, if the electronic apparatus 300 has already returned back to the authorized user and the authorized user wishes to unlock the protection mechanism and leave the sandbox system 341, an application for leaving the sandbox system 341 is found in the sandbox system 341. After inputting the original valid password, upon checking the correctness of the password, the authorized user can leave the sandbox system 341. As illustrated in step S635, in the state of executing the fake operating system, the unlock system 121 determines whether the valid password is received. Upon receiving the valid password, the protection system 123 is terminated to leave the sandbox system 341 and enter the real operating system.

Figure 8:
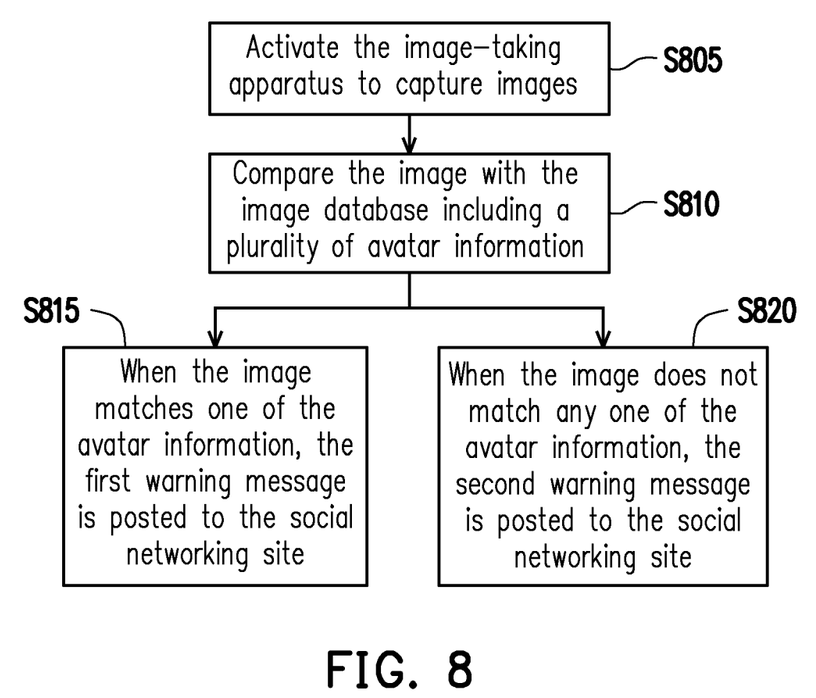
FIG. 8 is a method flow chart according to an embodiment of collecting usage information of an unauthorized user.

FIG. 8 is a method flow chart according to an embodiment of collecting usage information of an unauthorized user. Please refer to FIG. 3A, FIG. 3B, FIG. 6, and FIG. 8. In step S805, the sandbox system 341 activates the image-taking apparatus to capture the image. Then, in step S810, the image is compared with a plurality of the avatar information saved in the image database via the facial recognition system 347. Here, the avatar information is acquired from the social networking site via the photo collection system 345.

In step S815, when the image matches one of the avatar information saved in the image database, the first warning message is posted to the social networking site. The first warning message is a message marked with the user name corresponding to one of the avatar information. In addition, the image is posted to the social networking site together with the first warning message.

In step S820, when the image does not match any one of the avatar information saved in the image database, the second warning message is posted to the social networking site. The second warning message is a message without marking any user name. In addition, the captured image is posted together with the second warning message to the social networking site.

Besides, the protection system 123 further activates the GPS to acquire the current location information of the electronic apparatus 300. When the notification system 343 posts the first warning message or the second warning message to the social networking site, the location information is posted together to the social networking site.

Also, after collecting enough information, the protection system 123 further posts different types of posts based on the current invalid password type. For example, if it is the normal invalid password (first type), the notification system 343 directly posts the current collected information to the social networking site. If it is the special invalid password, step S810 to step S820 are executed. That is, the image is compared with a plurality of the avatar information saved in the image database by using the facial recognition system 347 to recognize whether the current user is a specified friend. Then, the notification system 343 posts the corresponding message to the social networking site.

Figure 9:
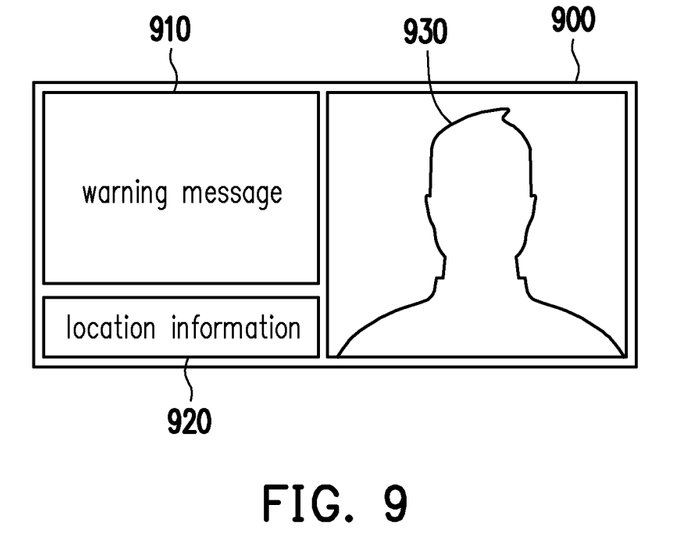
FIG. 9 is a schematic view according to an embodiment of a post format of the invention.

FIG. 9 is a schematic view according to an embodiment of a post format of the invention. Please refer to FIG. 9. A post format 900 includes a warning message 910, an image 930 of the unauthorized user captured by the collection unit 320, and a current location information 920 of the electronic apparatus 300.

For example, when the image-taking apparatus (collection unit 320) captures the image of the unauthorized user, and the invalid password receiving at this moment belongs to the normal invalid password, the protection system 123 calls the notification system 343 to post the second warning message to the social networking site, and posts the current location information of the electronic apparatus 300 together with the captured image to the social networking site.

In another embodiment, if the received invalid password belongs to the special invalid password, and the avatar information matching the image of the unauthorized user (the user name corresponding of which is, for example, "John") is found in the image database collected by the photo collection system 345 via the facial recognition system 347, the notification system 343 posts a new post of the first warning message to the social networking site via Internet connectivity provided by the network interface 350, marks "John" on the new post of the warning message 910, displays the current location information of the electronic apparatus 300 on the location information 920, and displays a photographed image or a captured usage information by the collection unit 320. Accordingly, friends on the social networking site can help to identify.

In another embodiment, if the received invalid password belongs to the special invalid password, but the avatar information matching the image of the unauthorized user is not found in the image database collected by the photo collection system 345 via the facial recognition system 347, the protection system 123 calls the notification system 343 and posts a new post to the social networking site via the Internet connectivity of a network unit. In the new post, no friend is marked, and only the location information of the electronic apparatus 300, captured image, and related warning messages are displayed.

In summary of the above, the protection mechanism provided by in the invention avoids the electronic apparatus being locked or disabled for continuously typing invalid passwords, and enters a special usage mode for the unauthorized user, maintain the electronic apparatus in an activated state. Accordingly, when the electronic apparatus is in the activated state, the chances of finding the electronic apparatus are thus increased, or the usage information of the unauthorized user is thus acquired. In addition, by the invalid password type, the unauthorized user's type is quickly identified the acquaintance of the authorized user or the stranger. Furthermore, by the usage frequency of the invalid password, the sandbox locked time increases or decrease to provide more chances of collecting information. After the information is collected, combined with the social networking site, the information is more efficiently spread.

By the friends on the social networking site, the chances of finding the stolen device and finding the specified unauthorized user enhance.

Although the invention is disclosed as the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:

1. An unlocking method of an electronic apparatus, wherein the electronic includes a processor driving an unlock system and a protection system, and the unlocking method comprises:
    receiving, by the unlock system, an input password by a user;
    determining, by the unlock system, whether the input password matches a valid password;
    and in response to the input password not matching the valid password, executing the following steps comprising:
        determining if the input password is currently saved in an input password database;
        when the input password is not currently saved in the input password database,
        saving the input password in the input password database, and
        setting an initial weight value as a corresponding weight uniquely associated with the saved input password;
    when the input password is currently saved in the input password database,
        incrementing the corresponding weight;
    activating, by the unlock system, a state recovery unit and the protection system;
    activating, by the protection system, a sandbox system which provides a simulation of a real operating system and entering a lock state of the sandbox system;
    collecting, by the protection system, a usage information for identifying the user after activating the sandbox system during a period of unlocking the sandbox system in the lock state;
    wherein, after entering the lock state of the sandbox system, locking, by the protection system, a display screen of the sandbox system by overlaying a plurality of blocked areas onto the display screen such that at least a portion of the user screen is covered by the plurality of overlaid block areas to render the at least a portion not useable or accessible by the user to thereby effectively prohibit usage of the at least one feature of the electronic apparatus by the user;
    wherein, the number of the plurality of blocked areas is proportional the corresponding weight;
    while at least one of the plurality of overlaid block areas has not been removed from the display screen:
        providing an input for receiving subsequent password inputs,
        upon receiving a sandbox system password from the subsequent password inputs, remove one of the plurality of blocked areas, and
        upon removing the last of the plurality of blocked areas, exit the lock state;
    wherein a higher value of the corresponding weight indicates a more frequently received attempted invalid password and a lower value of the corresponding weight indicates a less frequently received attempted invalid password: and
    wherein the value of the corresponding weight is inversely proportional to the length of the input password so that more subsequent password inputs are required to exit the locks state when the input password is shorter than when the input password is longer, due to the number of the plurality of blocked area, to provide sufficient time for the collecting of the usage information.

2. The unlocking method of the electronic apparatus according to claim 1, wherein in response to the input password does not match the valid password, further comprising:
    determining, by the unlock system, whether the input password matches one of a plurality of invalid passwords saved in an invalid password database;
    saving, by the unlock system, the input password to the invalid password database and activating, by the unlock system, the protection system when determining that the input password does not match any one of the invalid passwords saved in the invalid password database; and
    activating, by the unlock system, the protection system when determining that the input password matches one of the invalid passwords saved in the invalid password database.

3. The unlocking method of the electronic apparatus according to claim 2, further comprising:
    posting, by the protection system, a warning message based on the usage information to a social networking site,
    wherein the warning message is a first warning message marked with a username or a second warning message without marking any user name,
    wherein step of collecting, by the protection system, the usage information comprises:
        capturing an image; and
        comparing the image with a plurality of avatar information,
        wherein the avatar information is acquired from the social networking site; and
    wherein step of posting, by the protection system, the warning message based on the usage information to the social networking site comprises:
        posting the first warning message marked with the user name corresponding to the avatar information and the image to the social networking site when the image matches one of the avatar information; and
        posting the second warning message without marking any user name and the image to the social networking site when the image does not match any one of the avatar information.

4. The unlocking method of the electronic apparatus according to claim 3, wherein each of the invalid passwords in the invalid password database belongs to first type or second type, after step of capturing the image, further comprising:
    posting the second warning message and the image to the social networking site when one of the invalid passwords matching the input password belongs to the first type; and
    comparing the image with the plurality of the avatar information when one of the invalid passwords matching the input password belongs to the second type.

5. The unlocking method of the electronic apparatus according to claim 1, further comprising:

posting, by the protection system, a warning message based on the usage information to a social networking site,
wherein after activating the protection system,
activating a global positioning system to acquire a location information of the electronic apparatus;
wherein when the warning message is posted to the social networking site,
posting the warning message together with the location information to the social networking site.

6. The unlocking method of the electronic apparatus according to claim 3, further comprising:
connecting to the social networking site and acquiring a user list authorized by an account set by the electronic apparatus, wherein the user list comprises a plurality of user accounts; and
acquiring the plurality of the avatar information corresponding to the user accounts from the user list.

7. The unlocking method of the electronic apparatus according to claim 2, wherein step of saving, by the unlock system, the input password to the invalid password database when determining that the input password does not match any one of the invalid passwords saved in the invalid password database, further comprising:
setting a corresponding weight of the input password as 0;
wherein when determining that the input password matches one of the invalid passwords saved in the invalid password database, further comprising:
adding up the weight corresponding to one of the invalid passwords matching the input password.

8. The unlocking method of the electronic apparatus according to claim 2, wherein step of saving, by the unlock system, the input password to the invalid password database when determining that the input password does not match any one of the invalid passwords saved in the invalid password database, further comprising:
setting a corresponding weight of the input password as a negative value;
wherein when determining that the input password matches one of one the invalid passwords saved in the invalid password database, further comprising:
adding up the weight corresponding to one of the invalid passwords matching the input password, and then determining whether the weight is greater than or equal to 0; and
activating the protection system when the weight corresponding to one of the invalid passwords is greater than or equal to 0.

9. The unlocking method of the electronic apparatus according to claim 2, wherein the sandbox system provides a sandbox unlock screen comprising the plurality of blocked areas.

10. The unlocking method of the electronic apparatus according to claim 9, wherein each of the invalid passwords in the invalid password database has the corresponding weight.

11. An electronic apparatus, comprising: a storage device, comprising an unlock system and a protection system; and a processor, coupled to the storage device that causes the apparatus to implement the steps of:
receiving, by the unlock system, an input password by a user;
determining, by the unlock system, whether the input password matches a valid password;
and in response to the input password not matching the valid password, executing the following steps comprising:
determining if the input password is currently saved in an input password database;
when the input password is not currently saved in the input password database,
saving the input password in the input password database, and
setting an initial weight value as a corresponding weight uniquely associated with the saved input password;
when the input password is currently saved in the input password database,
incrementing the corresponding weight;
activating, by the unlock system, a state recovery unit and the protection system; activating, by the protection system, a sandbox system which provides a simulation of a real operating system and entering a lock state of the sandbox system;
collecting, by the protection system, a usage information for identifying the user after activating the sandbox system during a period of unlocking the sandbox system in the lock state;
-wherein, after entering the lock state of the sandbox system, locking, by the protection system, a display screen of the sandbox system by overlaying a plurality of blocked areas onto the display screen such that at least a portion of the user screen is covered by the plurality of the overlaid block areas to render the at least a portion not usable or accessible by the user to thereby effectively prohibit usage of the at least one feature of the electronic apparatus by the user;
wherein, the number of the plurality of blocked areas is proportional to the corresponding weight;
while at least one of the plurality of overlaid block areas has not been removed from the display screen:
providing an input for receiving subsequent password inputs,
upon receiving a sandbox system password from the subsequent password inputs, remove
one of the plurality of blocked areas, and
upon removing the last of the plurality of blocked areas, exit the lock state;
wherein a higher value of the corresponding weight indicates a more frequently received attempted invalid password and a lower value of the corresponding weight indicates a less frequently received attempted invalid password; and
wherein the value of the corresponding weight is inversely proportional to the length of the input password so that more subsequent password inputs are required to exit the locks state when the input password is shorter than when the input password is longer, due to the number of the plurality of blocked area, to provide sufficient time for the collecting of the usage information.

12. The electronic apparatus according to claim 11, wherein
the unlock system determines whether the input password matches one of a plurality of invalid passwords saved in an invalid password database; when determining that the input password does not match one of the invalid passwords saved in the invalid password database, the unlock system saves the input password to the invalid password database and activates the protection system; when determining that the input password matches one of the invalid passwords saved in the invalid password database, the unlock system activates the protection system.

13. The electronic apparatus according to claim 12, further comprising:
  posting, by the protection system, a warning message based on the usage information to a social networking site,
  wherein the warning message is a first warning message marked with a user name or a second warning message without marking any user name, the electronic apparatus further comprises an image-taking apparatus, and the storage device further comprises a notification system; wherein after activating the protection system, the protection system activates the image-taking apparatus to capture an image and compares the image with a plurality of avatar information, which is acquired from the social networking site; the protection system posts the first warning message marked with the user name corresponding to one avatar information and the image to the social networking site via the notification system when the image matches one of the avatar information; the protection system posts the second warning message without marking any user name and the image to the social networking sites via the notification system when the image does not match any one of the avatar information.

14. The electronic apparatus according to claim 13, wherein each of the invalid passwords in the invalid password database belongs to first type or second type,
  the protection system posts the second warning message and the image to the social networking site via the notification system when one of the invalid passwords matching the input password belongs to the first type;
  the protection system compares the image with the avatar information when the one of the invalid passwords matching the input password belongs to the second type.

15. The electronic apparatus according to claim 11, further comprising: a global positioning system, acquiring a location information of the electronic apparatus after activating the protection system; the protection system posts a warning message and the location information together to a social networking site via a notification system.

16. The electronic apparatus according to claim 13, wherein the protection system connects to the social networking site via a collection unit, and acquires a user list authorized by an account set by the electronic apparatus, wherein the user list comprises a plurality of user accounts, and the collection unit acquires the avatar information corresponding to the user accounts from the user list.

17. The electronic apparatus according to claim 12, wherein the unlock system saves the input password to the invalid password database when determining that the input password does not match any one of the invalid passwords saved in the invalid password database and then sets a corresponding weight of input password as 0;
  wherein when determining that the input password matches one of the invalid passwords saved in the invalid password database, the protection system adds up the weight corresponding to one of the invalid passwords matching the input password.

18. The electronic apparatus according to claim 12, wherein the unlock system saves the input password to the invalid password database when determining that the input password does not match any one of the invalid passwords saved in the invalid password database and then sets a corresponding weight of the input password as a negative value;
  when determining that the input password matches one of the invalid passwords saved in the invalid password database, adds up the weight corresponding to one of the invalid passwords matching the input password and then determining the weight is greater than or equal to 0; the unlock system activates the protection system when the weight corresponding to one of the invalid passwords is greater than or equal to 0.

19. The electronic apparatus according to claim 12, wherein the storage device further comprises:
  the sandbox system, providing a sandbox unlock screen, wherein the sandbox unlock screen comprises the plurality of blocked areas,
  wherein the sandbox system is activated via the protection system to enter the sandbox unlock screen.

20. The electronic apparatus according to claim 19, wherein each of the invalid passwords saved in the invalid password database has the corresponding weight.

* * * * *